US005577232A

United States Patent [19]
Priem et al.
[11] Patent Number: 5,577,232
[45] Date of Patent: Nov. 19, 1996

[54] METHOD AND APPARATUS FOR ALLOWING COMPUTER CIRCUITRY TO FUNCTION WITH UPDATED VERSIONS OF COMPUTER SOFTWARE

[75] Inventors: Curtis Priem, Fremont; Chris Malachowsky, Santa Clara; Bruce McIntyre, Cupertino; Guy Moffat, Palo Alto, all of Calif.

[73] Assignee: Sun Microsystems, Inc., Mountain View, Calif.

[21] Appl. No.: 363,305

[22] Filed: Dec. 22, 1994

Related U.S. Application Data

[63] Continuation of Ser. No. 176,881, Jan. 3, 1994, abandoned, which is a continuation of Ser. No. 716,672, Jun. 17, 1991, abandoned.

[51] Int. Cl.$^{6}$ .................... G06F 9/00
[52] U.S. Cl. .................... 395/500; 395/800
[58] Field of Search .................... 395/375, 500, 395/700

[56] References Cited

U.S. PATENT DOCUMENTS

| | | | |
|---|---|---|---|
| 4,590,556 | 5/1986 | Berger et al. | 395/700 |
| 4,677,548 | 6/1987 | Bradley | 395/800 |
| 4,763,242 | 8/1988 | Lee et al. | 395/500 |
| 4,858,114 | 8/1989 | Heath et al. | 395/775 |
| 4,876,639 | 10/1989 | Mensch, Jr. | 396/500 |
| 4,979,106 | 12/1990 | Schneider | 395/700 |
| 5,214,771 | 5/1993 | Clara et al. | 395/500 |

FOREIGN PATENT DOCUMENTS 282149 9/1988 European Pat. Off. .

OTHER PUBLICATIONS

Patent Abstracts of Japan, vol. 14, No. 66; Japanese Patent No. P–1003; Publication Date: Feb. 7, 1990; Applicant: Toshiba.

Author: Roger Finger; Title: *The Interconnect Space of Multibus II Simplifies Hardware/Software Use;* Computer Technology Review, vol. VII, No. 13; Fall, 1878, Los Angeles, California International Business Machines Technical Disclosure Bullentin, vol. 33, No. 10A, Title: *Program Which Controls Multiple Levels of Hardware* Mar., 1991, New York.

"Turbo Pascal Reference Guide, version 5.0", Borland International 1988, pp. 189–190.

Turley, James "*Advanced 80386 Programming Techniques*", Ch. 9 1988.

*Primary Examiner*—Parshotam S. Lall
*Assistant Examiner*—Viet Vu
*Attorney, Agent, or Firm*—Blakely Sokoloff Taylor & Zafman

[57] ABSTRACT

An arrangement for assuring the compatibility of versions of software produced for a particular computer hardware architecture including a hardware version register, apparatus for providing an indication of a version of hardware being utilized to operate a particular version of software, a software version register, apparatus for providing an indication of a version of software being run on the particular version of hardware, apparatus for comparing the version of hardware and the version software, and apparatus responsive to the results of the comparison for setting defaults and enabling circuitry in the hardware so that the version of software runs correctly on the version of hardware.

4 Claims, 2 Drawing Sheets

METHOD AND APPARATUS FOR ALLOWING COMPUTER CIRCUITRY TO FUNCTION WITH UPDATED VERSIONS OF COMPUTER SOFTWARE

This is a continuation of application Ser. No. 08/176,881, filed Jan. 03, 1994, abandoned, which is a continuation of application Ser. No. 07/716,672, filed Jun. 17, 1991, abandoned.

BACKGROUND OF THE INVENTION

1. Field of the Invention

This invention relates to computer circuitry, and more particularly, to methods and apparatus for allowing a new version of an architecture implementing new features to run both old and new versions of software for that architecture.

2. Background of the Invention

When computer circuitry is designed, it is given certain features. Often these features are known by the designers to be less than the designers would like to implement. However, because of time or money constraints or because it is not known whether the product will be an economic success, less than all the features the designers visualize are included. Those features omitted are often implemented in later versions of the hardware. In a somewhat similar manner, new features are often included in computer hardware when the users ask for those features, when methods of implementing the features are discovered, and when the means of realizing the features are attained. For any of these reasons and more, a successful hardware design often goes through a number of versions in which the later versions offer substantially more features than do the earlier.

When a first version of a particular architecture for computer equipment appears, first versions of software are written to make use of the features that the hardware implements. As later versions of hardware are released with additional features, newer versions of software are also released to make use of these newer features. Usually the hardware designers try to make their hardware compatible with all of the previous versions of software so that earlier versions of software may be run on the more recent hardware versions. Unless this can be accomplished, the hardware must wait for software to be developed before significant sales will occur. Sometimes this compatibility is not possible because of the way the various versions of hardware have been configured. The lack of backward compatibility has been known to turn excellent products into economic failures.

In a similar manner, with each later version of software making use of features of later hardware, the programmers try to make that software compatible with earlier versions of the hardware so that the software may be run on the earlier machines and will have a broader market. Sometimes this is not possible, and the market for the software is limited to the few new machines which have reached the market.

SUMMARY OF THE INVENTION

It is, therefore, an object of the present invention to provide a method and apparatus for assuring that new versions of hardware are compatible with versions of software written for older versions of the hardware.

It is another more specific object of the present invention to provide a method and apparatus by which the particular version of software may be determined and the hardware configured to run with that particular version of software.

These and other objects of the present invention are realized in an arrangement for assuring the compatibility of versions of software produced for a particular computer hardware architecture comprising a hardware version register, means for providing an indication of a version of hardware being utilized to operate a particular version of software, a software version register, means for providing an indication of a version of hardware for which the software being run was designed, means for comparing the indication of the version of hardware and the indication of a version of hardware for which the software being run was designed, means responsive to the results of the comparison for setting defaults and enabling circuitry in the hardware if the hardware is newer than the software, and means responsive to the results of the comparison for causing the software to refer to hardware for only those functions it is capable of implementing and emulating those functions not in the hardware so that the version of software runs correctly on the version of hardware.

These and other objects and features of the invention will be better understood by reference to the detailed description which follows taken together with the drawings in which like elements are referred to by like designations throughout the several views.

NOTATION AND NOMENCLATURE

Figure 1:
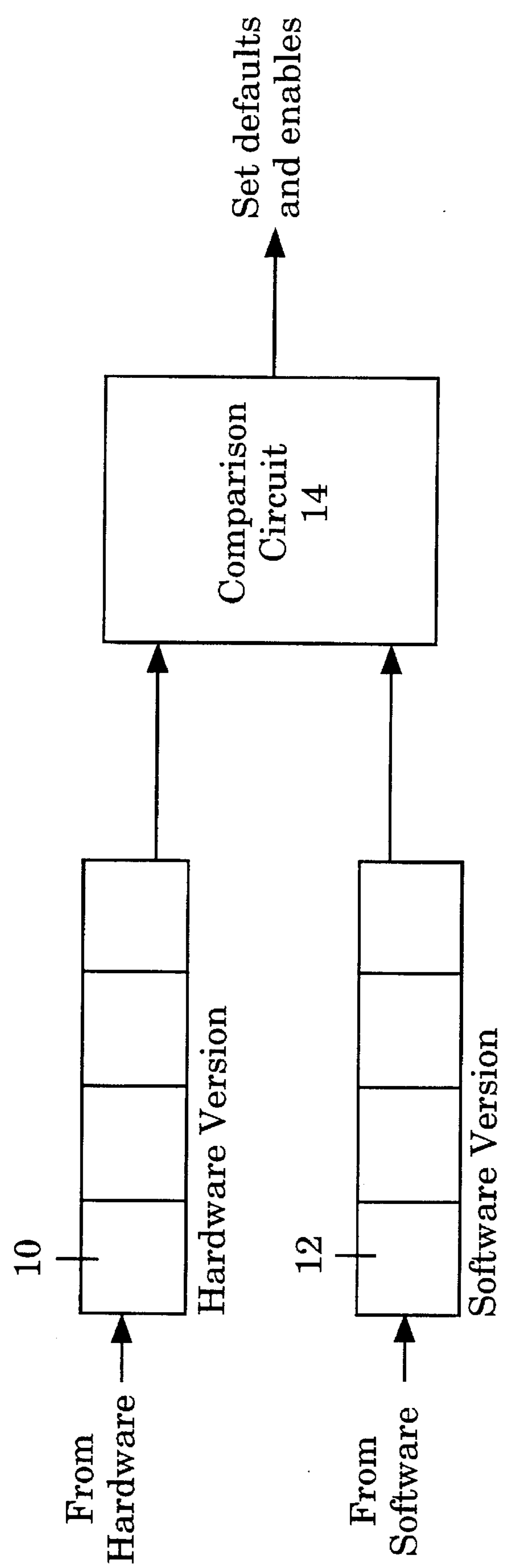
FIG. 1 is a diagram illustrating registers utilized in accomplishing the present invention

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

In order for a software program to be able to take advantage of the different features of a piece of computer hardware, the program must understand the particular version of the hardware with which it is dealing. To accomplish this, a number of manufacturers place a register in the hardware which will furnish a hardware version number upon request. In general, these registers are hardwired read only registers which may be read by a command from software. The data contained in the hardware version register indicates the particular piece of hardware and the version of that hardware.

The provision of such a register allows a new version of software to read the hardware version indication and perform in accordance with the functionality of the version of hardware available. That is, the software seeing the version of hardware on which it is running may carry out only functions adapted to work on that hardware. As may be realized, this is very useful because the software may be structured so that it will not attempt functions which will not run on older hardware and which might cause that hardware to work improperly.

On the other hand, if an older version of software was developed to run on an older version of the hardware than the hardware being used, reading a newer hardware version number about which the old software has no knowledge provides no information by which the software may adapt to the newer version. The software is incapable of having any knowledge of functions which might be implemented in new hardware.

Moreover, if a new version of hardware is changed from the older versions so that it responds incorrectly to commands given by the software designed to run on the older versions, then it cannot run that old software; and the market for the hardware may be significantly reduced. Since implementing new hardware features while retaining software compatibility is sometimes very difficult, it is also often quite costly. However, hardware designers will usually go to great lengths to retain compatibility because of the economics of selling their hardware to a greater market.

It will be obvious that since earlier versions of software cannot know what changes will be implemented in newer versions of hardware, it is only in the new hardware that any adaptation for compatibility with older versions of software may be provided.

A simple and elegant solution to the problem has been discovered. By providing in all versions of the hardware a register in which is stored a software version number, a comparison may be made of the software version number with the hardware version hardwired in the hardware version register. This software version number is a value provided by the software which indicate the version of hardware for which that software was written. Depending on which of the software or the hardware is the later to be developed, the comparison allows those features of the hardware for which the software is designed to be implemented and other features which might respond incorrectly to be disabled.

For example, if the software is a new version running on an old hardware version, a comparison by the software will show that the version number in the software version register is greater than that in the hardware version register. This difference will indicate which features of the software are not implemented in the hardware and therefore cannot be run on this hardware. This comparison will cause the software to adapt to the old version of hardware upon which it is running by eliminating certain calls to new hardware functions that would occur if the software were running on newer hardware. The software may accomplish this by causing values to be stored to indicate that certain hardware operations should not run. In such a case, the software provides processes for emulating those operations of the hardware which are not a part of the older hardware but are included as features of the newer software. Then, when the comparison is made, the software recognizes that the function cannot be accomplished in hardware, so it does not attempt the function in hardware. Instead, whenever the function is attempted, the software transfers to a software process which emulates the missing hardware function.

If the software is a new version running on an old hardware version, the comparison of the version numbers has no effect on the hardware operation. The hardware simply continues to provide all of the functions it has always provided. All of the adjustments which are needed are taken care of by the new software.

On the other hand, if the hardware is a newer version while the software is an older version, the comparison causes the hardware to configure itself to appear as though it were the hardware which the older software expects to see. The hardware does this by disabling those new functions which the older software cannot run. Typically this is accomplished by setting state and utilizing logic in the hardware to disable these newer hardware functions. In the case where the hardware is a newer version while the software is an older version, the comparison has no effect on the operation of the older software; it simply run as it would typically run on the older version of hardware for which it was designed.

Finally, if the software is a version designed specifically for that particular version of the hardware so that the values in the two registers are equal, the comparison has no effect on either the hardware or the software. Each runs in the typical manner in which it is expected to run.

FIG. 1 illustrates a pair of registers 10 and 12. The register 10 may be a read only register hardwired to store a value of a particular piece of hardware when power is applied to the hardware. This value may indicate the version of the hardware. For example, four bit positions are provided in register 10, as illustrated in FIG. 1, so that sixteen individual versions may be indicated. The register 12, on the other hand, may be used to store a value provided by a particular version of a piece of software. Again, four bit positions are provided so that sixteen versions of the software may be stored. In the preferred embodiment of the invention, the value indicates the version of hardware for which the software was designed. On the other hand, the value might indicate an actual version of software and a lookup table provided to indicate which functions are provided by which software.

Each of the values stored in the registers 10 and 12 are transferred to a hardware comparison circuit 14. The hardware includes circuitry to conduct the comparison using a comparator. When the hardware is a newer version than that for which the software was designed, the hardware uses this comparison to generate signals (for example, using a state machine or combinatorial logic) setting default values and disabling certain functions so that the hardware appears to the software to be the hardware for which that software was designed. The results of the comparison are illustrated in the figure by the various output signals from the comparator 14. When the hardware is a older version than that for which the software was designed, the hardware simply acts in its normal manner.

In a case in which the software is designed for a newer version of hardware than the hardware available, the software reads the value in the register 10. If it sees that it is designed for later hardware, the software disables any of its operations which the older hardware cannot accomplish and indicates that those functions are instead to be emulated in software. If the software sees that the hardware version is newer than the version for which it was written, it simply carries out its normal functions.

In any case, the arrangement allows any version of software to be run on any version of hardware which includes the two registers.

It is especially desirable that the register used for holding the software version number be one which may be both read and written during program operation. For example, if this hardware circuit is a graphics accelerator circuit to be used for displaying the output of programs on a computer output display, such a circuit may be displaying a number of application programs at the same time in a number of windows on the display. Some of these application programs may be capable of using certain features of the hardware while other programs may not. For example, certain programs (new programs) may be capable of being double buffered in order to eliminate frame tearing while other programs (old programs) may not. It is useful that the hardware be able to implement the features for which each program is adapted each time the hardware switches to operate that program. To accomplish this, the value of the software version must be changeable as the program being run changes; and the comparison must be made with each change.

In a preferred embodiment of the invention, this is accomplished by requiring the hardware to make a new comparison each time a new value is written to the software version register. Then each time software makes use of the hardware, the first thing it does is to write to the software version register forcing the comparison. Simultaneously, the software reads the hardware version register so that the software can configure itself. In this manner, each of a number of programs running on a particular piece of hardware force the comparison at each use and correctly render the hardware and software compatible.

It will be recognized by those skilled in the art that certain hardware will require registers much larger than those illustrated in FIG. 1. For example, a central processor which may run a myriad of programs might require a register sufficient to include manufacturers identifications as well as version numbers. On the other hand a piece of hardware which may function With only a single program in its various versions will not require this facility.

Figure 2:
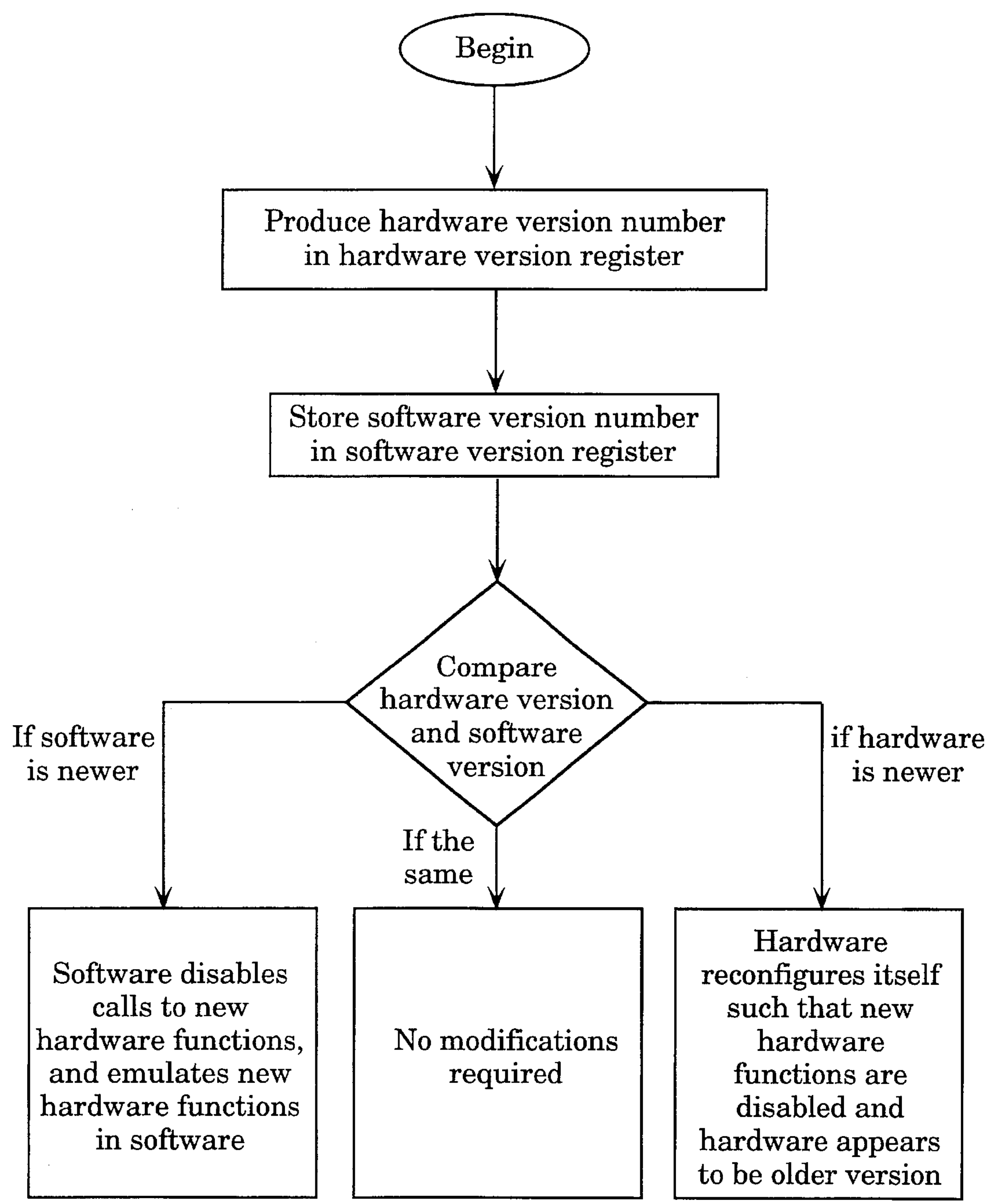
FIG. 2 is a flow chart illustrating the method of the present invention.

FIG. 2 is a flow chart illustrating the steps of the operation described above by which software in its various versions is made compatible with various versions of a particular piece of hardware. The process begins typically on power-up of the hardware where at step 20 a hardware version number in a hardware version register becomes available. At step 22, the program being run writes a software version number to a software version register. At step 24, a comparison of the values in the hardware version register and the software version register is made. At step 26, if the hardware is a newer version than that for which the software was designed, the hardware sets the various default values so that it appears to be the version of hardware for which the program was designed. Alternatively, if the comparison shows the software is newer, the software disables calls to the hardware for those new functions which are not implemented in the older hardware and indicates that these functions must be implemented by software processes as shown in step 28. However, if the hardware version register and the software version register are equal than no changes must be made to the software or hardware.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An arrangement for assuring the compatibility of versions of software produced for a particular computer hardware architecture of a computer system comprising:

a hardware version register in said computer system, said hardware version register providing an indication of a hardware version for said computer hardware architecture being utilized to execute a software program being a particular software version;

a software version register in said computer system, said software version register for storing an indication of an optimal hardware version for said software program being run, said software program storing said indication of an optimal hardware version in said software version register, said indication of an optimal hardware version indicating a hardware version that said particular software version was designed for;

a comparator unit in said computer system, said comparator unit for comparing the indication of the hardware version in the hardware version register and the indication of an optimal hardware version in the software version register after said software program stores said optimal hardware version in said software version register;

an adaptive circuit in said computer system coupled to said comparator unit, said adaptive circuit eliminating features of said computer system not present in said optimal hardware version of said computer hardware if the hardware version in the hardware version register is newer than the optimal hardware version in the software version register; and a software program, said software program comparing said indication of said hardware version with said indication of an optimal hardware version, if said the hardware version in the hardware version register is older than the optimal hardware version in the software version register then said software program causing the software to refer to said computer hardware for only those functions that said computer hardware is capable of implementing by emulating a first subset of functions not available in the computer hardware architecture with said indication of said hardware version; and eliminating any references to a second subset of functions not available in the computer hardware architecture with said indication of said hardware version;

such that the software program runs correctly on the computer hardware architecture.

2. The arrangement for assuring the compatibility of versions of software produced for a particular computer hardware architecture as claimed in claim 1 in which the hardware version register comprises hardwired read-only memory, and in which the software version register may be written to and read during any operation.

3. A machine implemented method for assuring the compatibility of versions of software produced for a particular computer hardware architecture, said machine implemented method comprising the steps of:

providing readable indication of a hardware version for said particular computer hardware architecture being utilized to operate a particular software version;

storing an indication of an optimal hardware version for the particular software version in a software version register, said optimal hardware version being a particular hardware version for which said software version being run was designed for;

comparing the indication of the hardware version and the optimal hardware version;

configuring circuitry in the particular computer hardware architecture to eliminate features not present in said optimal hardware version in response to the results of the comparison if the hardware version is newer than the optimal hardware version; and configuring the software if the hardware version is older than the optimal hardware version such that the software refers to the particular computer hardware architecture for only those functions that the particular computer hardware architecture is capable of implementing by emulating a first subset of functions not available in the computer hardware architecture with said indication of said hardware version; and eliminating any references to a second subset of functions not available in the computer hardware architecture with said indication of said hardware version.

4. An arrangement for the compatibility of version of software produced for a particular computer hardware system, said arrangement comprising:

a computer hardware system, said computer hardware system having a hardware version number, said computer hardware system comprising:

a hardware version register, said hardware version register storing said hardware version number;

a software version register;

a computer program for running on said computer hardware system, said computer program having an optimal hardware version number that indicates a particular hardware version for which said computer program was designed, said computer program storing said optimal hardware version number in said software version register, said computer program reading said hardware version register and comparing said hardware version number with said optimal hardware version number, if said optimal hardware version number is greater than said hardware version number then said computer program eliminates any references to a first subset of functions not available in the computer hardware system having said hardware version number; and said computer program emulates a second subset of functions not available in the computer hardware system having said hardware version number; and a comparison circuit in said computer hardware system, said comparison circuit comparing said hardware version number in said hardware version register with said optimal hardware version number stored in said software version register, said comparison circuit configuring said computer hardware to eliminate features not present in said particular hardware version defined by said optimal hardware version number if said hardware version number is greater than said optimal hardware version number.

* * * * *